(12) United States Patent
Curry et al.

(10) Patent No.: US 12,199,889 B2
(45) Date of Patent: *Jan. 14, 2025

(54) UNIDIRECTIONAL GATEWAY MEDIATED DELIVERY OF DATA MESSAGES

(71) Applicant: OPSWAT Inc., Tampa, FL (US)

(72) Inventors: John Curry, New River, AZ (US); Tzvetan Chaliavski, Arlington, VA (US); Cosmin Banciu, Raleigh, NC (US)

(73) Assignee: OPSWAT Inc., Tampa, FL (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/054,107

(22) Filed: Nov. 9, 2022

(65) Prior Publication Data

US 2023/0085632 A1 Mar. 23, 2023

Related U.S. Application Data

(63) Continuation of application No. PCT/US2021/034725, filed on May 28, 2021.

(60) Provisional application No. 63/032,962, filed on Jun. 1, 2020.

(51) Int. Cl.
*H04L 49/90* (2022.01)
*H04L 12/46* (2006.01)

(52) U.S. Cl.
CPC .......... *H04L 49/9068* (2013.01); *H04L 12/46* (2013.01)

(58) Field of Classification Search
CPC .............................. H04L 12/46; H04L 49/9068
See application file for complete search history.

(56) References Cited

U.S. PATENT DOCUMENTS

| | | | |
|---|---|---|---|
| 7,904,565 B2 * | 3/2011 | Holden | H04L 9/3273 709/227 |
| 9,819,679 B1 * | 11/2017 | Bertz | H04L 63/0435 |
| 2005/0033990 A1 * | 2/2005 | Harvey | H04L 63/105 726/4 |
| 2008/0220879 A1 * | 9/2008 | Barrie | G07F 17/32 463/42 |
| 2010/0115027 A1 | 5/2010 | Ryu et al. | |
| 2010/0169392 A1 | 7/2010 | Ran et al. | |
| 2012/0017079 A1 * | 1/2012 | Mraz | H04L 9/3236 713/153 |

(Continued)

OTHER PUBLICATIONS

International Search Report and Written Opinion dated Nov. 2, 2021 for PCT Patent Application No. PCT/US2021/034725.

(Continued)

*Primary Examiner* — Nazia Naoreen
(74) *Attorney, Agent, or Firm* — MLO, a professional corp.

(57) ABSTRACT

A method includes transmitting, by a first interface card in a trusted domain, data. A second interface card in an untrusted domain receives the data. The second interface card stores the data to a first memory location in the untrusted domain, and verifies integrity of the data. The second interface card writes a result of the verifying in a second memory location in the untrusted domain. The first interface card in the trusted domain retrieves the result of the verifying from the second memory location in the untrusted domain. The first interface card in the trusted domain determines if the data in the transmitting was received by the second interface card based on the result.

19 Claims, 5 Drawing Sheets

(56) References Cited

U.S. PATENT DOCUMENTS

| | | | |
|---|---|---|---|
| 2013/0067023 A1 | 3/2013 | Joy et al. | |
| 2013/0345530 A1* | 12/2013 | McRoberts | H04L 67/141 |
| | | | 600/323 |
| 2015/0039891 A1* | 2/2015 | Ignatchenko | H04L 63/0853 |
| | | | 718/1 |
| 2015/0067104 A1* | 3/2015 | Curry | H04L 63/0209 |
| | | | 709/218 |
| 2015/0074767 A1 | 3/2015 | Clark | |
| 2015/0181484 A1* | 6/2015 | Bruhn | H04W 72/541 |
| | | | 370/329 |
| 2016/0034702 A1 | 2/2016 | Sikka | |
| 2016/0119289 A1* | 4/2016 | Jain | H04L 69/08 |
| | | | 726/12 |
| 2016/0306995 A1 | 10/2016 | Arasu et al. | |
| 2019/0005254 A1 | 1/2019 | Arasu et al. | |
| 2019/0095488 A1 | 3/2019 | Bhattacharjee et al. | |
| 2019/0173919 A1 | 6/2019 | Irimie et al. | |
| 2020/0259585 A1* | 8/2020 | Aust | H04L 1/00 |
| 2022/0174047 A1 | 6/2022 | Curry et al. | |

OTHER PUBLICATIONS

International Search Report and Written Opinion dated Oct. 4, 2021 for PCT Patent Application No. PCT/US2021/034815.
"User-Level Network Interface Protocols"; Bhoedjang et al.; Computer ( vol. 31, Issue: 11, Nov. 1998) (Year: 1998).
Office Action dated Apr. 11, 2023 for U.S. Appl. No. 17/651,387.
Notice of Allowance and Fees dated Aug. 31, 2023 for U.S. Appl. No. 17/651,387.

* cited by examiner

UNIDIRECTIONAL GATEWAY MEDIATED DELIVERY OF DATA MESSAGES

CROSS-REFERENCE TO RELATED APPLICATIONS

This application is a continuation of PCT application PCT/US2021/034725 filed May 28, 2021 and entitled "Unidirectional Gateway Mediated Delivery of Data Messages," which claims priority to and the benefit of U.S. Provisional Patent Application No. 63/032,962, filed Jun. 1, 2020 and entitled "Unidirectional Gateway Mediated Delivery of Data Messages," which are incorporated herein by reference in their entirety.

FIELD

The present disclosure relates to the unidirectional delivery of data messages and confirmation of successful delivery of the data messages.

BACKGROUND

A unidirectional gateway is a network appliance or device that allows data to travel in only one direction.

SUMMARY

In some embodiments, a method includes transmitting, by a first interface card in a trusted domain, data. A second interface card in an untrusted domain receives the data. The second interface card stores the data to a first memory location in the untrusted domain, and verifies integrity of the data. The second interface card writes a result of the verifying in a second memory location in the untrusted domain. The first interface card in the trusted domain retrieves the result of the verifying from the second memory location in the untrusted domain. The first interface card in the trusted domain determines if the data in the transmitting was received by the second interface card based on the result.

In some embodiments, a method includes transmitting by a first interface card in a trusted domain, data to a second interface card in an untrusted domain. Communication between the first interface card and the second interface card is unidirectional with a non-networked connection. The first interface card in the trusted domain retrieves a result from a memory location in the untrusted domain. The first interface card in the trusted domain determines if the data in the transmitting was received by the second interface card based on the result.

In some embodiments, a method includes receiving by a second interface card in an untrusted domain, data from a first interface card in a trusted domain. Communication between the first interface card and the second interface card is unidirectional with a non-networked connection. The second interface card stores the data to a first memory location in the untrusted domain, and verifies integrity of the data. The second interface card writes a result of the verifying in a second memory location in the untrusted domain.

DETAILED DESCRIPTION

Embodiments of the present disclosure can be used in the application of a unidirectional data gateway, as deployed, for example, in a typical transmission control protocol/Internet protocol (TCP/IP) network. An example use case includes the use of two separate domains-one trusted domain, and one untrusted domain. Data can be permitted to pass from the trusted domain (or "trusted side") to the untrusted domain (or "untrusted side"), while network access and/or data flow from the untrusted domain to the trusted domain is not possible (i.e., unidirectional) because no mechanism exists for network transport or data transfer of any kind from the untrusted domain to the trusted domain. In other words, data exchange in a unidirectional data gateway is, by default, only possible from the trusted side to the untrusted side, and never in reverse. Stated another way, no networking signals or content can be received at the trusted side from the untrusted side.

A data diode is a communication device that facilitates secure, one-way transfers of data between segmented networks. Hardware-based data diodes, for example, can ensure unidirectional data flow by making it physically impossible for the trusted side to receive data from the untrusted side. In such implementations, the untrusted side has a "receive" capability (but not a "send" capability) in its network interface, while the trusted side has a "send" capability (but not a "receive" capability).

Known data diodes share several common features. First, data diodes impose physical isolation, in that communication is only physically possible in one direction: from the trusted domain to the untrusted domain. This is typically enforced using a single strand of fiber with a transmitter at one end and a receiver at the other end. Second, data diodes transmit data flows without confirmation. In other words, the transmitting side of a data diode does not ever "know" (e.g., does not receive a reply message) whether the transmitted data arrived at the receiving side, as there is no return path of any type. Third, the physical isolation of a data diode is typically accomplished using a complex software environment to manage the one-way data exchanges. Fourth, data transmissions via known data diodes include a protocol "break," such that there is no full networking handshake between the two domains. The protocol break occurs when a compute device on the trusted-side terminates an incoming network request and, after some amount of signaling and data transfer to a compute device of the untrusted side, an equivalent network connection is built by the compute device of the untrusted-side, for final delivery to the intended destination.

As noted above, known data diodes lack an ability to confirm successful receipt of data at the untrusted side (i.e., no "guaranteed delivery"). In other words, the trusted side can only send data out; there is no mechanism by which the trusted side can determine whether or not the data was successfully received at the untrusted side. As such, the compute device of the untrusted side typically re-transmits each message multiple times, resulting in lower overall throughput and computational efficiency due to re-transmission overhead. Known data diodes also have a limited ability to support multiple concurrent data streams (e.g., from more than one distinct source on the trusted side, to one or more destinations on the untrusted side) without consuming further computational/transmission overhead.

Systems and methods set forth herein overcome the aforementioned shortcomings of known data diodes by employing two compute devices are connected to one another using a Peripheral Component Interconnect Express (PCIe) data link. One of the compute devices is connected to a network in a trusted domain, and the other compute device is connected to the same or a different network in an untrusted domain. The data link between the two compute devices is not a network connection, but rather uses a non-routable schema (optionally implemented in hardware) as a communications topology, thereby completely eliminating the possibility of any network connection between the two compute devices, and guaranteeing full isolation of the trusted domain from the untrusted domain. The trusted domain and the untrusted domain may reside in a common network, or may reside in different networks. The trusted domain and the untrusted domain are bridged without introducing a routable network connection.

In some embodiments, a method for guaranteeing data delivery via a unidirectional data gateway is accomplished includes initiating a unidirectional non-networked connection between a pair of network interface cards, with each network interface card from the pair of interface cards installed in a corresponding side or portion of a data delivery platform (a "trusted" portion and an "untrusted" portion). One network interface card from the pair of interface cards is associated with a trusted domain ("trusted side network interface card"), and the other interface card from the pair of interface cards is associated with an untrusted domain ("untrusted side network interface card"). The interface cards, in turn, are physically connected to one another (e.g., via a serial cable). A communications protocol of the data delivery platform can use the interface cards as a physical transport medium. The trusted side network interface card transmits an encoded data block to the untrusted side network interface card via the data delivery platform. The untrusted side network interface card writes that data block, once received and in response to receiving that data block, to a first fixed memory segment (memory segment "A") on the untrusted portion of the data delivery platform. Software on the untrusted portion of the data delivery platform detects the arrival of the data block and retrieves it from memory segment A. The software on the untrusted side of the data delivery platform verifies the integrity of the incoming data using a series of validity checks of the communications protocol of the data delivery platform. The result of the validity check (e.g., "GOOD" or "BAD") is written to a second fixed memory segment on the untrusted portion of the data delivery platform. A compute device of the trusted portion of the data delivery platform reads from the second fixed memory segment and determines whether the previous transmission was successful.

Stated another way, in some embodiments, the trusted side network interface card delivers data to a memory location on the untrusted side network interface card, and one or more software monitors on the untrusted portion of the data delivery platform detect the arrival of the data at the untrusted portion of the data delivery platform and retrieve it from the untrusted portion of the data delivery platform. Concurrently, or at least partially overlapping in time, software on the untrusted portion of the data delivery platform calculates a checksum for the incoming data and writes it to a known memory location on the untrusted side network interface card. The trusted side network interface card includes a representation of that known memory location and is able to read/retrieve the value that has been written to it. The trusted side network interface card then compares that retrieved value to a predetermined benchmark value. If the retrieved value matches predetermined benchmark value, the data was received correctly. Hence, delivery is guaranteed without a network connection and without a control signal or data being sent from the untrusted side directly to the trusted side.

In some embodiments, a transmission status is not written directly to the trusted portion of the data delivery platform (e.g., the trusted side network interface card), and there is no mechanism by which the untrusted portion of the data delivery platform can write directly to the trusted portion of the data delivery platform, thus enforcing the unidirectional nature of the system.

Figure 1:
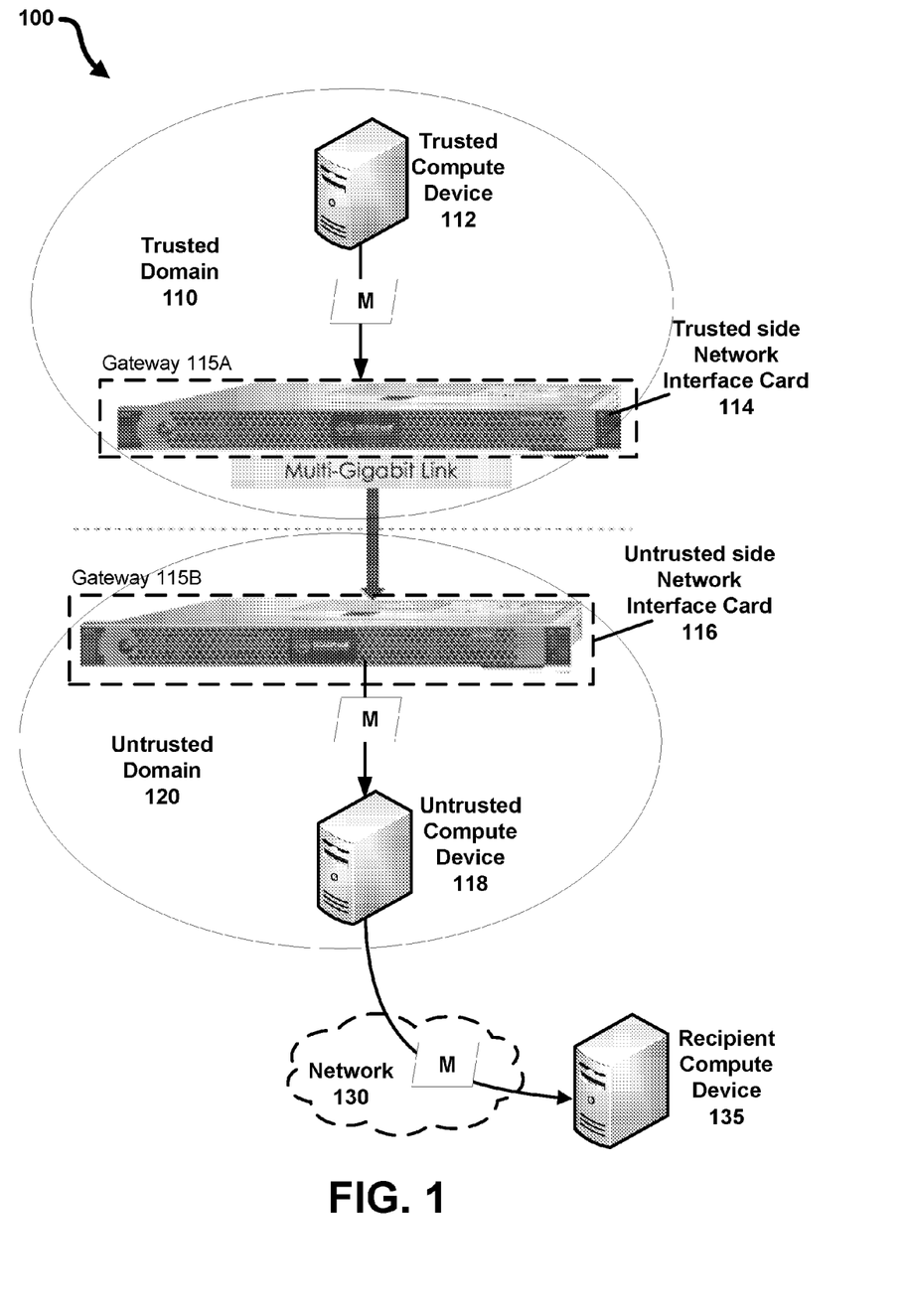
FIG. 1 is a diagram of a system for unidirectional gateway mediated delivery of data messages, according to some embodiments.

FIG. 1 is a diagram of a system for unidirectional gateway mediated delivery of data messages, according to some embodiments. As shown in FIG. 1, a data delivery platform 100 includes a trusted domain 110 and an untrusted domain. Included within the trusted domain 110 are a trusted compute device 112 and a trusted side network interface card 114. Included within the untrusted domain 120 are an untrusted compute device 118 and an untrusted side network interface card 116. The trusted side network interface card 114 can be included in a gateway 115A. Alternatively, the trusted side network interface card 114 can be included as part of the trusted compute device 112. Similarly, the untrusted side network interface card 116 can be included in a gateway 115B. Alternatively, the untrusted side network interface card 116 can be included as part of the untrusted compute device 118. In some embodiments, the gateway 115A and the gateway 115B are combined as a single gateway that includes one or both of the trusted side network interface card 114 and the untrusted side network interface card 116. During operation, the trusted compute device 112 (optionally in response to a received request to transmit a message "M" to recipient/destination compute device 135) sends a signal encoding a message to the trusted side network interface card 114 for delivery. A multi-gigabit link may be present between the trusted side network interface card 114 and the untrusted side network interface card 116. The transmission of the message may be accomplished as described in FIGS. 3A-3B.

Figure 2A:
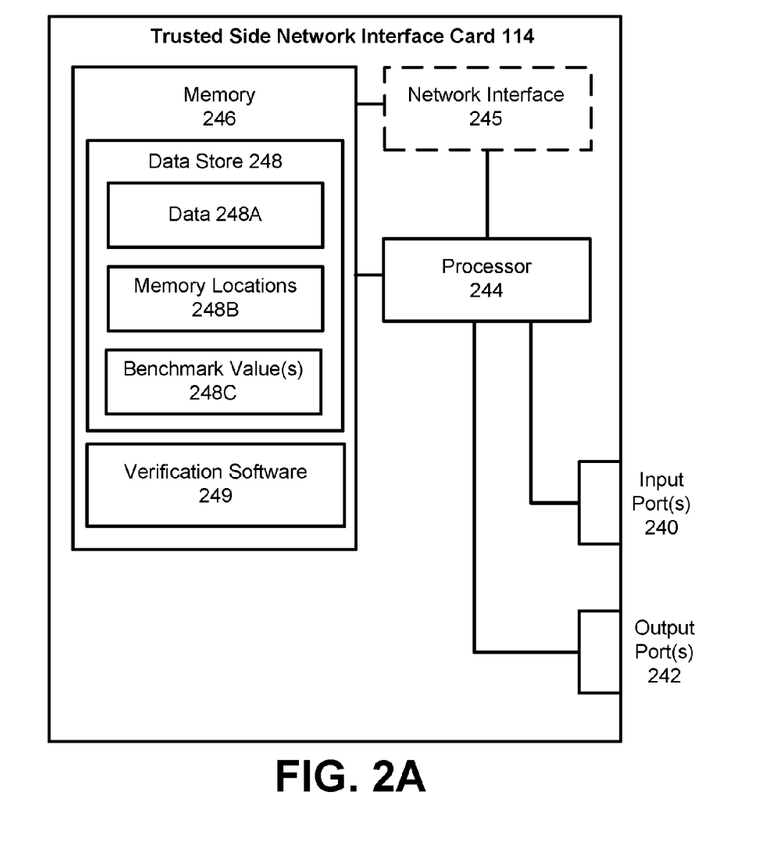
FIG. 2A is a block diagram of a trusted side network interface card of a data delivery platform, according to some embodiments.

FIG. 2A is a block diagram of a trusted side network interface card of a data delivery platform, according to some embodiments. As shown in FIG. 2A, the trusted side network interface card 114 includes one or more input ports 240, one or more output ports 242, a processor 244, an optional network interface 245, and a memory 246. The memory 246 includes a data store 248 storing data 248A (e.g., encoding one or more messages to be transmitted), memory locations 248B, and one or more benchmark values 248C. The memory also includes verification software 249.

Figure 2B:
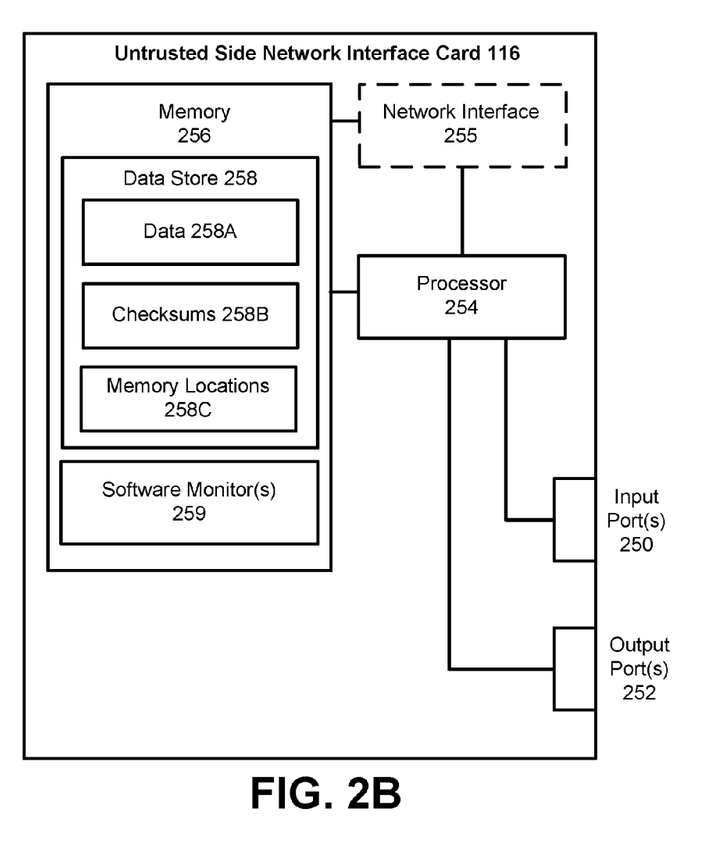
FIG. 2B is a block diagram of an untrusted side network interface card of a data delivery platform, according to some embodiments.

FIG. 2B is a block diagram of an untrusted side network interface card of a data delivery platform, according to some embodiments. As shown in FIG. 2B, the untrusted side network interface card 116 includes one or more input ports 250, one or more output ports 252, a processor 254, an optional network interface 255, and a memory 256. The memory 256 includes a data store 258 storing data 258A (e.g., encoding one or more messages to be transmitted), checksums 258B, and memory locations 258C. The memory also includes one or more software monitors 259.

Figure 3A:
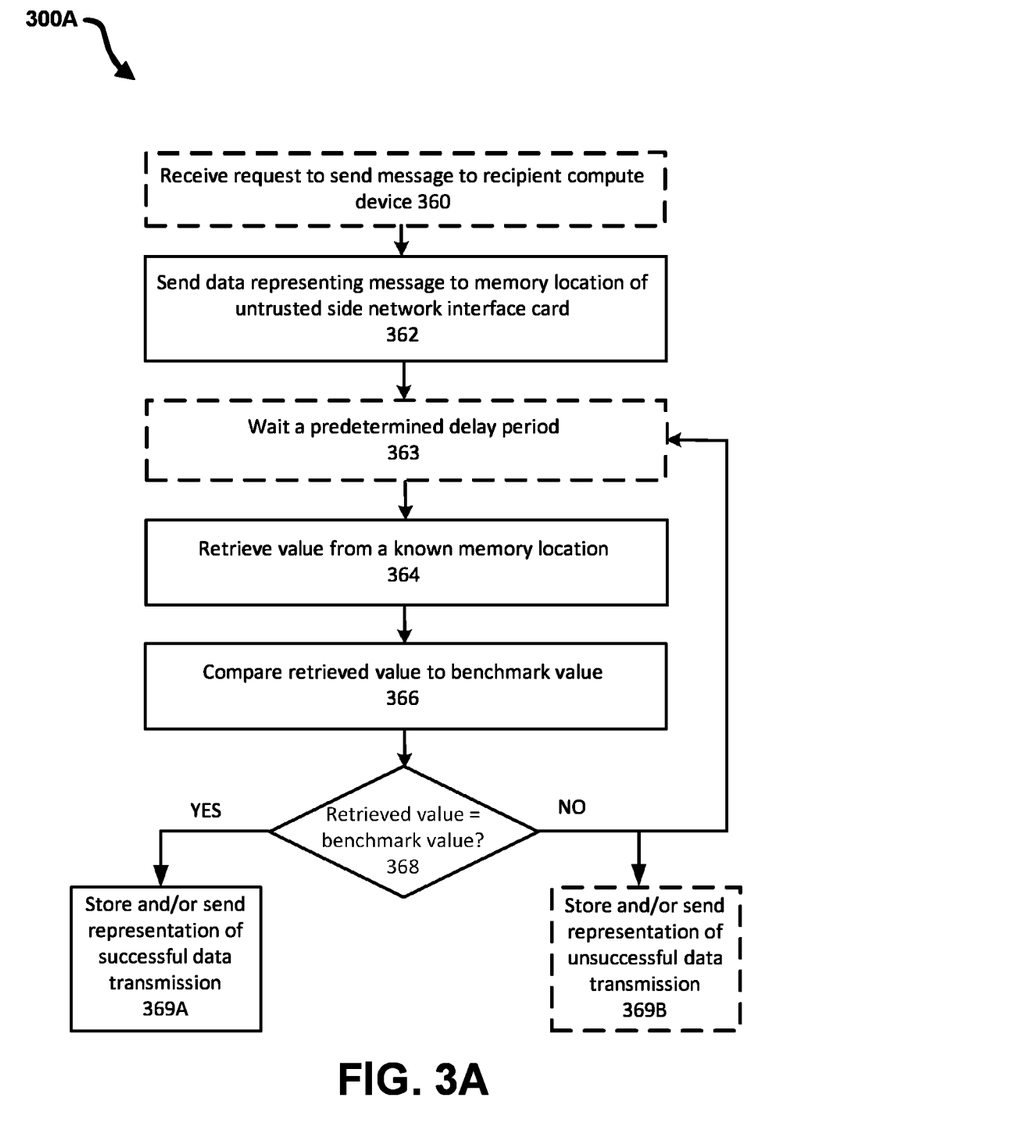
FIG. 3A is a flow diagram illustrating a method of unidirectional gateway mediated delivery of data messages, from the point of view of a trusted side network interface card of a data delivery platform, according to some embodiments.

FIG. 3A is a flow diagram illustrating a method of unidirectional gateway mediated delivery of data messages, from the point of view of a trusted side network interface card of a data delivery platform, according to some embodiments. As shown in FIG. 3A, the method 300A includes sending data representing a message to a memory location of an untrusted side network interface card, at 362, optionally preceded by receiving a request, at 360, to send a message to a recipient compute device. After an optional predetermined delay period at 363, the method 300A next includes retrieving a value, at 364, from a known memory location, and comparing the retrieved value, at 366, to a benchmark value. If, at 368, the retrieved value is equal to ("matches") the benchmark value, a representation that the data transmission (to an untrusted side network interface card of the data delivery platform) has been successful is stored and/or sent, at 369A. If, at 368, the retrieved value is not equal to the benchmark value, a representation that the data transmission (to an untrusted side network interface card of the data delivery platform) has been unsuccessful may be stored and/or sent, at 369B. Alternatively or in addition, the method 300A can loop back to step 363, to wait an additional predetermined delay period before again retrieving a value from the known memory location (at 364) and subsequent analysis.

Figure 3B:
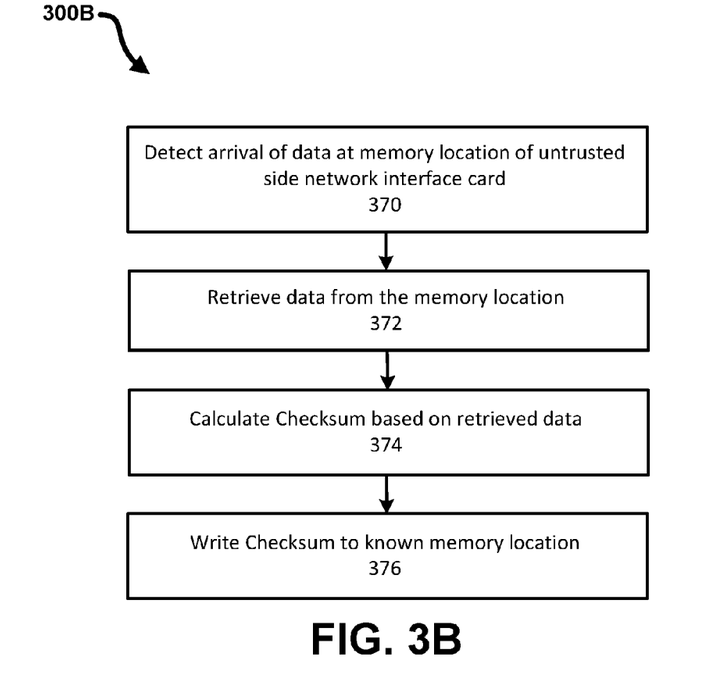
FIG. 3B is a flow diagram illustrating a method of unidirectional gateway mediated delivery of data messages, from the point of view of an untrusted side network interface card of a data delivery platform, according to some embodiments.

FIG. 3B is a flow diagram illustrating a method of unidirectional gateway mediated delivery of data messages, from the point of view of an untrusted side network interface card of a data delivery platform, according to some embodiments. As shown in FIG. 3B, the method 300B includes detecting arrival of data at a memory location of the untrusted side network interface card, at 370, and retrieving data from that memory location, at 372. A checksum is calculated, at 374, based on the retrieved data. The method 300B then includes writing the checksum to the known memory location 376, e.g., for retrieval via the trusted side (e.g., the trusted side network interface card) of the data delivery platform All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figures.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can include instructions, implemented in code, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

It is to be understood that the claims are not limited to the precise configuration, data structure, data formats, and/or components illustrated above. Various modifications, changes and variations may be made in the arrangement, operation and details of the systems, methods and apparatus described herein without departing from the scope of the claims.

The invention claimed is:

1. A method comprising:
   transmitting, by a first interface card in a trusted domain, data;
   receiving, by a second interface card in an untrusted domain, the data;
   storing, by the second interface card, the data to a first memory location in the untrusted domain;
   verifying, by the second interface card, integrity of the data;
   writing, by the second interface card, a result of the verifying in a second memory location in the untrusted domain;
   retrieving, by the first interface card in the trusted domain, the result of the verifying from the second memory location in the untrusted domain; and
   determining, by the first interface card in the trusted domain, if the data in the transmitting was received by the second interface card based on the result;
   wherein communication between the first interface card and the second interface card is unidirectional from the first interface card to the second interface card and does not involve another interface card, and the data and content cannot be received in the trusted domain from the untrusted domain.

2. The method of claim 1, wherein the result is good, indicating the data was received by the second interface card, or the result is bad, indicating the data was not received by the second interface card.

3. The method of claim 1, further comprising:
   comparing, by the first interface card, the result to a predetermined benchmark value; and
   when the result matches the predetermined benchmark value in the comparing, determining the data was received by the second interface card.

4. The method of claim 1, wherein only the second interface card in the untrusted domain has access to the first memory location in the untrusted domain.

5. The method of claim 1, wherein the verifying performs a series of validity checks in a proprietary communications protocol.

6. The method of claim 1, wherein the first interface card in the trusted domain and the second interface card in the untrusted domain are directly physically connected to one another by a cable.

7. The method of claim 1, wherein communication between the first interface card and the second interface card is with a non-networked connection.

8. The method of claim 1, wherein:
   the first interface card and the second interface card are Peripheral Component Interconnect Express (PCIe) interface cards; and
   a communication protocol between the first interface card and the second interface card is a non-routable schema.

9. A method comprising:
   transmitting, by a first interface card in a trusted domain, data to a second interface card in an untrusted domain, wherein communication between the first interface card and the second interface card is unidirectional from the first interface card to the second interface card and does not involve another interface card, and the data and content cannot be received in the trusted domain from the untrusted domain;
   retrieving, by the first interface card in the trusted domain, a result from a memory location in the untrusted domain; and
   determining, by the first interface card in the trusted domain, if the data in the transmitting was received by the second interface card based on the result.

10. The method of claim 9, wherein the result is good, indicating the data was received by the second interface card, or the result is bad, indicating the data was not received by the second interface card.

11. The method of claim 9, further comprising:
    comparing, by the first interface card, the result to a predetermined benchmark value; and
    when the result matches the predetermined benchmark value in the comparing, determining the data was received by the second interface card.

12. The method of claim 9, wherein the first interface card in the trusted domain and the second interface card in the untrusted domain are directly physically connected to one another by a cable.

13. The method of claim 9, wherein:
    the first interface card and the second interface card are Peripheral Component Interconnect Express (PCIe) interface cards; and
    a communication protocol between the first interface card and the second interface card is a non-routable schema.

14. A method comprising:
    receiving, by a second interface card in an untrusted domain, data from a first interface card in a trusted domain, wherein communication between the first interface card and the second interface card is unidirectional from the first interface card to the second interface card and does not involve another interface card, and the data and content cannot be received in the trusted domain from the untrusted domain;

storing, by the second interface card, the data to a first memory location in the untrusted domain;

verifying, by the second interface card, integrity of the data; and writing, by the second interface card, a result of the verifying in a second memory location in the untrusted domain;

wherein the result of the verifying can be read by the first interface card.

15. The method of claim 14, wherein the result is good, indicating the data was received by the second interface card, or the result is bad, indicating the data was not received by the second interface card.

16. The method of claim 14, wherein only the second interface card in the untrusted domain has access to the first memory location in the untrusted domain.

17. The method of claim 14, wherein the verifying performs a series of validity checks in a proprietary communications protocol.

18. The method of claim 14, wherein the first interface card in the trusted domain and the second interface card in the untrusted domain are directly physically connected to one another by a cable.

19. The method of claim 14, wherein:

the first interface card and the second interface card are Peripheral Component Interconnect Express (PCIe) interface cards; and a communication protocol between the first interface card and the second interface card is a non-routable schema.

* * * * *